Feb. 14, 1961 — G. H. McLAFFERTY — 2,971,328
CONTROL SYSTEM FOR AIR INLET BYPASS
Filed July 22, 1958 — 3 Sheets-Sheet 1

INVENTOR
GEORGE H. McLAFFERTY
BY
ATTORNEY

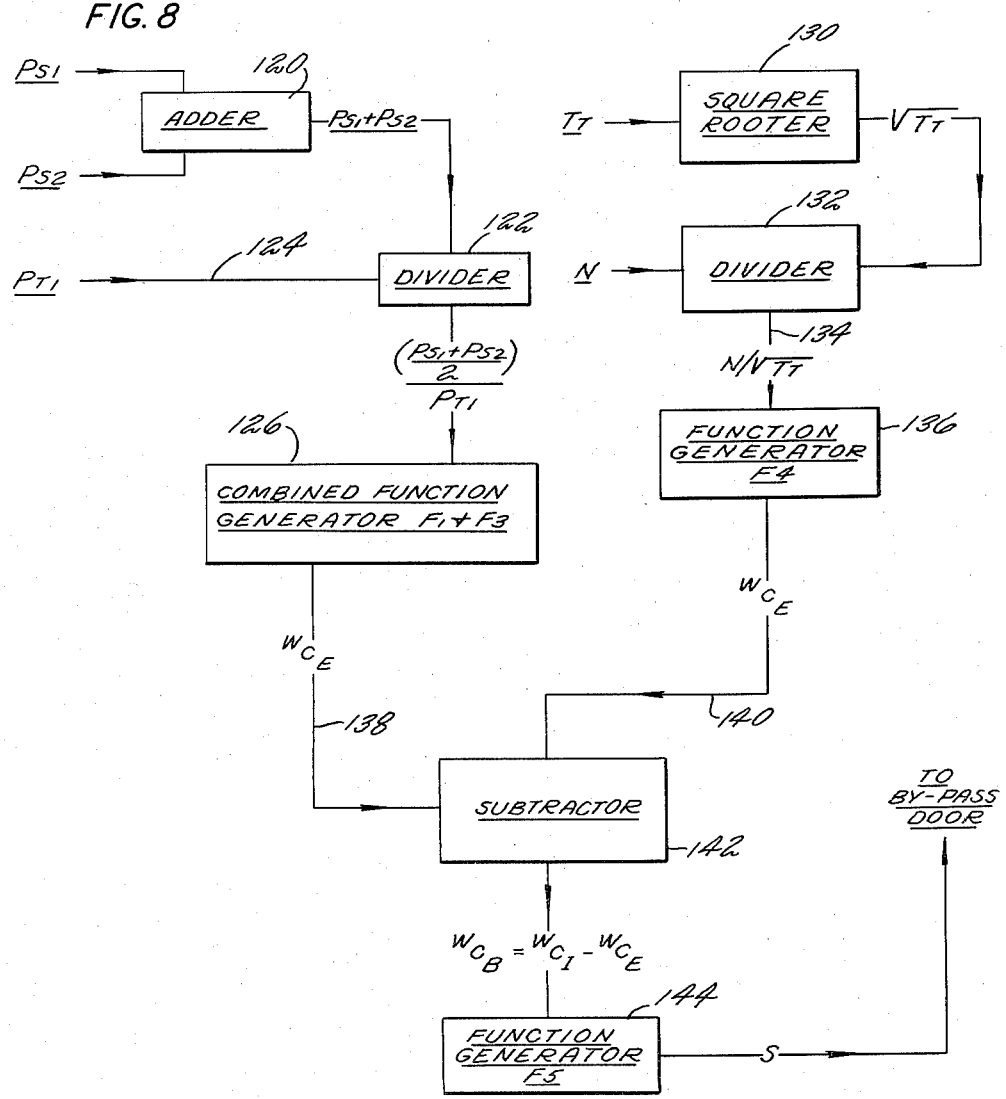

United States Patent Office 2,971,328
Patented Feb. 14, 1961

2,971,328

CONTROL SYSTEM FOR AIR INLET BYPASS

George H. McLafferty, Manchester, Conn., assignor to United Aircraft Corporation, East Hartford, Conn., a corporation of Delaware Filed July 22, 1958, Ser. No. 750,190

6 Claims. (Cl. 60—35.6)

This invention relates to high speed aircraft air inlets and more specifically for control mechanisms for air bypass systems.

In very high speed aircraft which fly at varied supersonic Mach numbers and at varied angles of attack, it is necessary that the correct amount of air be fed to the power plant. In turbine type power plants this amount of air must be closely regulated so that the mass flow from the air inlet and the mass flow to the compressor are properly matched at all times. In other words, it is desired to operate the air inlet at a given corrected airflow while the engine demands a certain corrected airflow, the latter being determined according to this invention by sensing and computing $N/\sqrt{T_T}$, where N is speed of rotation of the power plant and $T_T$ is the total temperature of the air in the inlet. The amount of air taken in by the aircraft power plant air inlet can be controlled by varying the geometry of the inlet or by taking in all the air possible and then dumping a portion of the air overboard or to some other source by means of bypass doors so that the correct amount of air passes on to the compressor. The bypass air may be controlled by suitable bleed doors in response to certain control signals. The air received by the compressor is known as the corrected engine airflow. The bypass control system must compare the corrected engine airflow with the desired inlet corrected airflow so as to open or close the bypass doors the necessary amount. These measurements in the ordinary bypass systems are made by an integrating rake which measures a plurality of pressure differences across the duct. The gauges which in turn measure the pressure differences are highly inaccurate since they must work over a wide range and, at times, very small pressure differentials at extreme altitudes. A rake, on the other hand, is an inaccurate measuring device of airflow which may leave the inlet because a rake is not sufficiently sensitive to the various profiles of pressure found in the inlet under various operating conditions. Finally this type of device has an inherent lag in the system due to the time that is required for any aerodynamic signal to travel, for example, from the compressor to the measuring element, namely, the integrating rake.

It is therefore an object of this invention to provide a system for controlling the position of an air inlet bypass door which eliminates the sources of inaccuracy found in the conventional bypass systems as enumerated above.

It is a further object of this invention to provide a bypass door control system which relies on the fact that the sum of the bypass corrected airflow $W_{CB}$ and the engine corrected airflow $W_{CE}$ must be equal to the inlet corrected airflow $W_{CI}$.

It is a still further object of this invention to provide a control of the type described which fundamentally establishes the inlet corrected airflow by means of sensing free stream Mach number and angle of attack and determining the engine corrected airflow by sensing speed of rotation of the power plant or compressor, sometimes known as wheel speed. These parameters may be corrected for, as will be described hereinafter.

As stated above, the bypass corrected airflow $W_{CB}$ plus the engine corrected airflow $W_{CE}$ must be equal to the inlet corrected airflow $W_{CI}$. This relation may be put in the following equations:

$$W_{CI} = W_{CE} + W_{CB}$$

or $$W_{CB} = W_{CI} - W_{CE}$$

Therefore, as shown from the last-mentioned equation above, the bypass corrected airflow $W_{CB}$ and hence the position of the bypass door leading out from the inlet duct can be determined by subtracting the engine corrected airflow $W_{CE}$ from the desired inlet corrected airflow $W_{CI}$.

These and other objects of this invention will become readily apparent from the following detailed description of the drawings, in which:

Fig. 8 is a simplified block diagram of the control of this invention wherein some of the trimming devices are eliminated.

Figure 1:
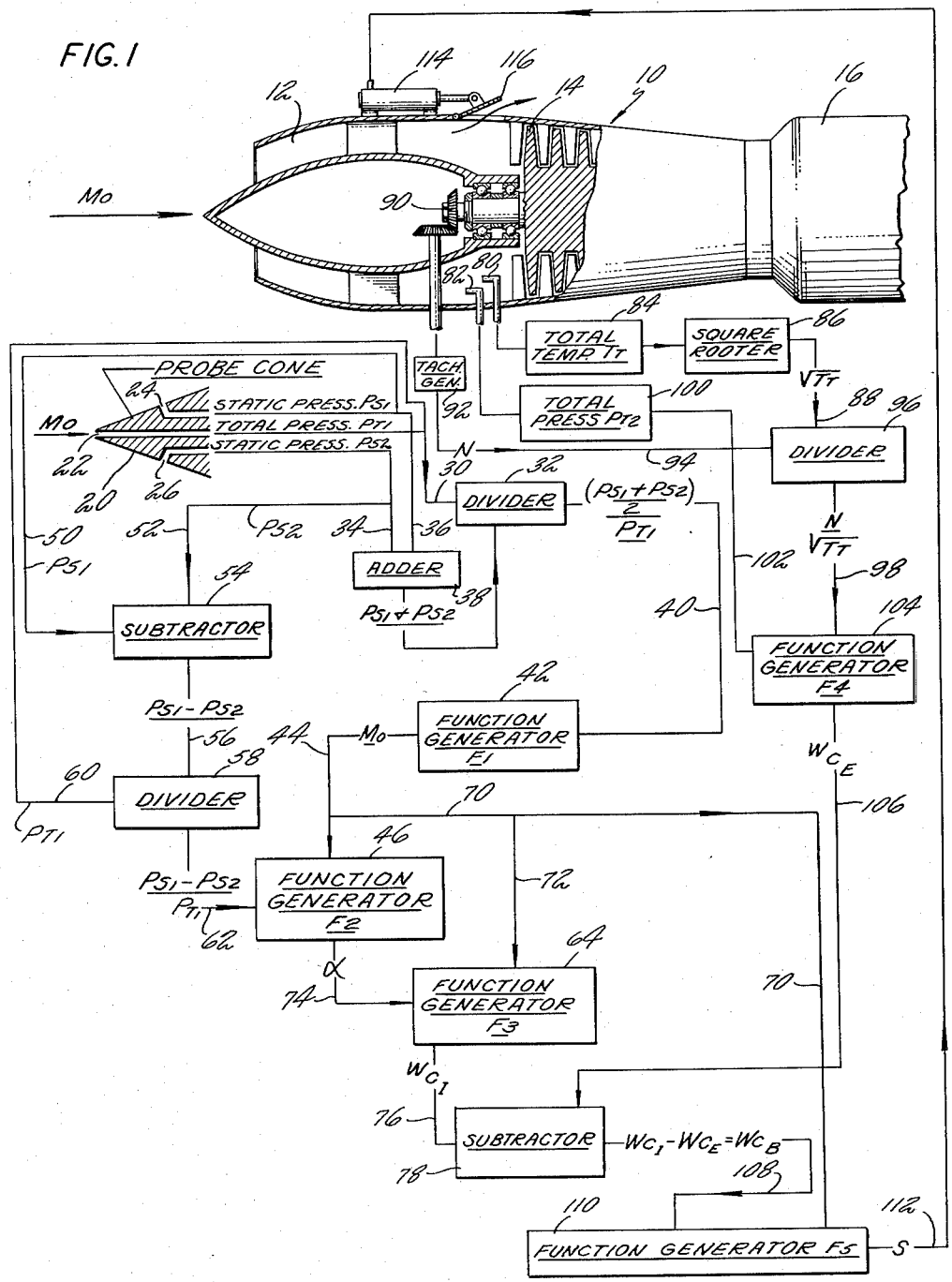
Fig. 1 is a partial cross section and block diagram of a typical power plant inlet and control elements, respectively.

Referring to Fig. 1, a turbojet power plant is partially shown at 10 as having an inlet opening 12 which receives air from the free airstream at high Mach numbers and conducts it to the compressor 14. This air is then compressed and burned in a combustion chamber 16. The products of combustion may then drive a turbine which then drives a compressor and the exhaust gases are emitted as a propulsive jet.

Figure 2:
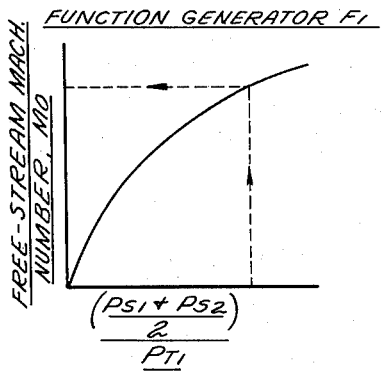
Figs. 2 through 6 are curves illustrating the inputs and outputs of the five function generators.
Figure 3:
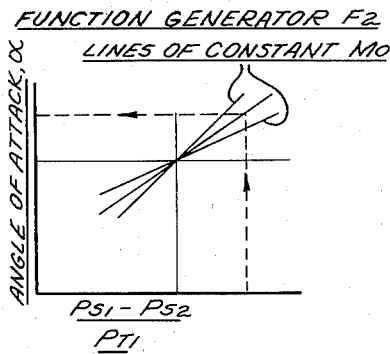

As stated above, the fundamental of this invention is to measure the Mach number of the free stream to obtain a signal equivalent to the desired inlet corrected weight flow and then to sense compressor speed to thereby obtain the engine corrected airflow and to subtract these two quantities to obtain the desired corrected bypass flow. To obtain the desired inlet corrected airflow, a probe cone schematically illustrated at 20 is positioned in the free airstream. It is the purpose of the probe cone to obtain primarily the Mach number of the free airstream. This is an indication of the desired corrected flow at the inlet. However, at various angles of attack there will be a slight variation in the desired corrected airflow so that to obtain a more exact corrected airflow, it may be necessary to modify the Mach number signal with an angle of attack signal. To obtain Mach number and angle of attack signals, the probe cone 20 has a total pressure tap 22 and two static pressure taps 24 and 26 on opposite sides of the cone. These taps 24 and 26 measure the cone static pressures $P_{S_1}$ and $P_{S_2}$. Mach number is determined from the ratio of the average cone static pressure to the total pressure. The total pressure $P_{T_1}$ is fed via the line 30 to a divider 32. The two cone static pressures $P_{S_1}$ and $P_{S_2}$ are fed via the lines 34 and 36 to an adder 38. Thus, the adder 38 adds the two cone static pressures $P_{S_1}$ and $P_{S_2}$ and sends this result to the divider 32. The divider 32 then divides the sum of the two static pressures by a factor of two to obtain average cone static pressure and then divides by the total pressure. The adder and the divider shown in block diagram are well known electronic or mechanical devices. Electronic devices to provide these functions or the other functions of the block diagrams are clearly shown in the book entitled Electronic Analog Computers by Korn and Korn published 1956—second edition—by McGraw Hill Book Company. This book disclosed various means for multiplying, dividing, subtracting, and providing the square root or any other similar calculations by electronic means. The final signal coming from the divider through the line 40 determines the Mach number of the free airstream by the function generator $F_1$ identified by the reference numeral 42. The input and output of the function generator 42 is shown in Fig. 2. This also may be done by any suitable computing device such as that disclosed in the above-referred-to book or, for example, those disclosed in the Cronstedt Patent No. 2,629,936 issued March 3, 1953. The function generator 42 ($F_1$) is intended to produce a final Mach number signal $M_0$ which is a function of the calibration of the probe 20. In other words, for any given condition a certain desired output signal is obtained. This Mach number signal is then passed via the line 44 into the function generators 46 ($F_2$) and via other lines for uses which will be explained in later paragraphs. In order to measure angle of attack, the static pressures $P_{S_1}$ and $P_{S_2}$ are also fed via lines 50 and 52 to a subtractor 54. The subtractor provides a signal of the difference of these two pressures via the line 56. The signal from the line 56 is then fed into a divider 58 along with a total pressure signal of the free airstream via the line 60. The divider then takes the ratio of the difference of the static pressures and the total pressure to provide a final signal related to angle of attack through the line 62. This signal is then fed into the function generator 46 ($F_2$). The input and output of the function generator $F_2$ is shown in Fig. 3. The relation between angle of attack and the inputs to function generator $F_2$ may be predicted accurately from probe calibration or theory. The modification of this signal for the free stream Mach number is supposedly small and may possibly be omitted.

Figure 4:
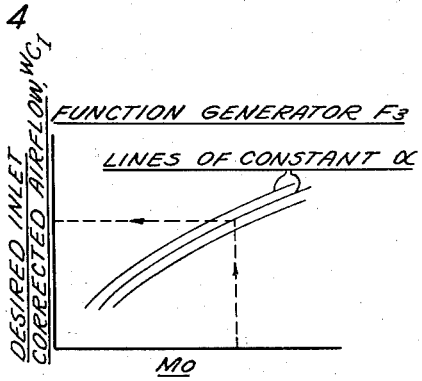

The pure Mach number signal $M_0$ is also conducted along the lines 70 and 72 directly to the function generator 64 ($F_3$) whose characteristics are given in Fig. 4. Here the angle of attack signal $\alpha$ from the line 74 is received and combined with the Mach number signal to provide a final signal which is a function of the desired inlet corrected weight flow $W_{C_I}$. This signal is passed through the line 76 and eventually to a subtractor 78.

Figure 5:
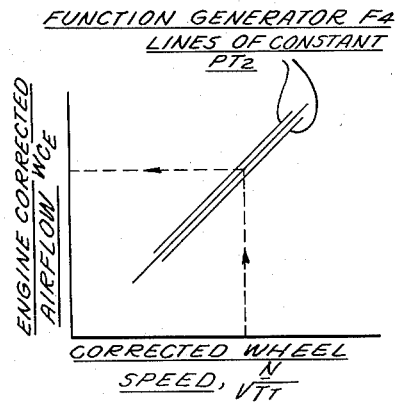
Figure 6:
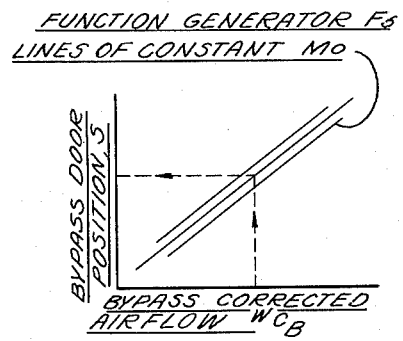

The engine corrected airflow $W_{C_E}$ is obtained by sensing total temperature from the sensor 80 and total pressure $P_{T_2}$ through the sensor 82 immediately upstream of the compressor of the power plant. The total temperature is converted to a suitable signal by the unit 84 and passed through the square rooter 86 so that a signal is eventually conducted in the line 88 which is the square root of the total temperature. The speed of rotation of the power plant is also obtained by means of the gears 90 which may drive a tachometer generator 92 which in turn passes a wheel speed signal N through the line 94. The wheel speed signal and the total temperature signal are divided by the divider 96 so that a signal is passed to the line 98 which is a ratio of wheel speed to the square root of the total temperature. A total pressure signal from the box 100 passes through the line 102 and then to the function generator $F_4$ designated on the drawing by the numeral 104. The function generator combines the total pressure signal with the signal which is the ratio of wheel speed to the quare root of total temperature to produce a final signal $W_{C_E}$ which is the engine airflow. The function generator $F_4$ passes out a signal which is the schedule obtained from engine characteristics. A function generator $F_4$ output and input are seen in Fig. 5. The addition of the total pressure as a signal to the function generator $F_4$ provides for a correction for the Reynolds number. However, this effect is so minor that it may possibly be omitted. The engine airflow signal $W_{C_E}$ is conducted via the line 106 and combined in the subtractor 78 with the desired inlet airflow signal. These signals are then subtracted so that the desired or necessary bypass flow $W_{C_B}$ is eventually passed as a signal via the line 108. This signal is fed to a function generator $F_5$ indicated as a box by the numeral 110 wherein this signal is again modified somewhat by the Mach number signal coming from the line 70. The schedule of the function generator $F_5$ is obtained from a calibration of the bypass door characteristics. The final signal S is passed via the line 112 to a servo motor 114 which opens or closes the bypass door 116. Fig. 6 shows a typical schedule for the function generator $F_5$.

Some of the corrections as, for example, for Reynolds number, angle of attack and total pressure adjacent to the compressor entrance are somewhat minor and may be omitted.

Figure 7:
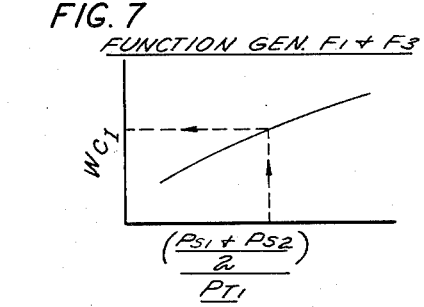
Fig. 7 is a curve illustrating a combination of the output function generators 1 and 3.

Fig. 8 shows a simplified schematic wherein some of these minor corrections have been eliminated. Thus, for example, the two static pressures sensed from the probe are passed to an adder 120 and eventually to a divider 122. The divider also receives the total pressure signal via the line 124. The output of the divider as was the case in Fig. 1 produces a signal which is the average of the static pressures divided by the total pressure. This signal is then passed to a combined function generator $F_1$ and $F_3$ indicated by the box 126. The input and output of this function generator is schematically shown in Fig. 7. In a manner similar to Fig. 1, the total temperature is passed through the square rooter 130 while the wheel speed signal and the square root of the total temperature are fed to the divider 132. This ratio of wheel speed to the square root of total temperature is fed through the output line 134 to a function generator $F_4$ indicated by a box 136. Thus the box 126 and the box 136 provide signals which are commensurate with the desired inlet airflow and the engine airflow, respectively, via the lines 138 and 140. These signals are passed through a subtractor 142 to obtain the desired bypass flow. This bypass flow signal is passed through the function generator $F_5$ indicated by the box 144. This signal S is then passed back to the bypass door. It will be noted that the simplified construction of Fig. 8 eliminated some of the minor corrections which were provided in the Fig. 1 construction.

As a result of this invention a very accurate means of controlling the airflow in an inlet and to an engine is provided. The amount of airflow necessary to be bypassed is also very accurately and continuously controlled.

Although only two embodiments of this invention have been illustrated and described herein, it will become readily apparent that various changes and modifications may be made in the construction and arrangement of the various parts without departing from the scope of this novel concept.

What it is desired by Letters Patent is:

1. In combination, a turbine-type power plant including a compressor, a combustion chamber and a turbine for driving the compressor, an inlet for the compressor, an air inlet duct extending upstream from said inlet and terminating in an upstream ambient air-receiving opening and forming a substantially unobstructed passage, passage means in the wall of said duct and located between said opening and the upstream end of said compressor, said passage means bleeding air from said duct, means for varying the area of said passage means to vary the amount of air bled from said duct, means sensing a flow condition which is a function of the actual flow in said passage, and providing a first signal means responsive to at least a condition of the air flowing to the compressor, which condition is indicative of temperature of said air and a variable of operation of the power plant which is indicative of power output for producing a second signal, and means responsive to a difference of said signals for controlling said area varying means for matching the air flow to said inlet with the compressor requirements.

2. In a combination according to claim 1 wherein said condition of the air is the total temperature thereof.

3. In combination, a turbine-type power plant including a compressor, a combustion chamber and a turbine for driving the compressor, an inlet for the compressor, an air inlet duct extending upstream from said inlet and terminating in an upstream ambient air-receiving opening, passage means in the wall of said duct and located between said opening and the upstream end of said compressor, said passage means bleeding air from said duct, means for varying the area of said passage means to vary the amount of air bled from said duct, means sensing a flow condition to produce a first signal which is a function of the actual air flow in said passage, means producing a signal proportional to the speed of rotation of the compressor, means producing another signal proportional to the temperature of the air in said inlet, means for combining said signals to provide a final resultant signal which is a function of the ratio of said speed to the square root of said temperature, and means responsive to the difference of said first and resultant signals for controlling said area varying means.

4. In combination, a turbine type power plant including a compressor, a combustion chamber and a turbine for driving the compressor, an inlet for the compressor, an air inlet duct extending upstream from said inlet and terminating in an upstream ambient air receiving opening, passage means in the wall of said duct and located between said opening and the upstream end of said compressor, said passage bleeding air from said duct, means for varying the area of said passage means to vary the amount of air bled from said duct, means for sensing a parameter of air flow which is a function of the actual flow in the inlet for creating a first signal, first means for modifying said first signal in accordance with a predetermined schedule, means responsive to the speed of rotation of said compressor and a function of the temperature of the air in said inlet for creating a second signal, second means for modifying said second signal in accordance with a predetermined schedule, and means responsive to a difference of said first and second modified signals for controlling said area varying means.

5. In combination, a turbine type power plant including a compressor, a combustion chamber and a turbine for driving the compressor, an inlet for the compressor, an air inlet duct extending upstream from said inlet and terminating in an upstream ambient air receiving opening, passage means in the wall of said duct and located between said opening and the upstream end of said compressor, said passage bleeding air from said duct, means for varying the area of said passage means to vary the amount of air bled from said duct, means for sensing the Mach number of the free airstream outside of the inlet for creating a first signal, first means for modifying said first signal in accordance with a predetermined schedule, means responsive to the speed of rotation of said compressor and a function of the temperature of the air in said inlet for creating a second signal, second means for modifying said second signal in accordance with a predetermined schedule of inlet total pressure, and means responsive to a difference of said first and second modified signals for controlling said area varying means.

6. In combination, a turbine type power plant including a compressor, a combustion chamber and a turbine for driving the compressor, an inlet for the compressor, an air inlet duct extending upstream from said inlet and terminating in an upstream ambient air receiving opening, passage means in the wall of said duct and located between said opening and the upstream end of said compressor, said passage bleeding air from said duct, means for varying the area of said passage means to vary the amount of air bled from said duct, means for sensing the Mach number of the free airstream outside of the inlet for creating a first signal, first means for modifying said first signal in accordance with a predetermined schedule, means responsive to the angle of attack of the inlet for further modifying said first signal, means responsive to the speed of rotation of said compressor and a function of the temperature of the air in said inlet for creating a second signal, second means for modifying said second signal in accordance with a predetermined schedule of inlet air total pressure, means responsive to a difference of said first and second modified signals for creating a final signal, and means responsive to a function of the Mach number of the free airstream for modifying said final signal and controlling said area varying means.

References Cited in the file of this patent

UNITED STATES PATENTS

| 2,776,806 | Brendal | Jan. 8, 1957 |
| 2,785,848 | Lombard et al. | Mar. 19, 1957 |
| 2,840,322 | Griffith | June 24, 1958 |
| 2,861,419 | Hausmann | Nov. 25, 1958 |
| 2,870,601 | Demetriades | Jan. 27, 1959 |
| 2,873,576 | Lombard | Feb. 17, 1959 |

FOREIGN PATENTS

| 205,372 | Australia | Mar. 29, 1956 |
| 614,548 | Great Britain | Dec. 17, 1948 |

OTHER REFERENCES

Stack-Flight Magazine Article, "Engine Intake Controls," Dec. 27, 1957, vol. 77, No. 2553, pages 1000–1002.